United States Patent [19]

Withers, Jr.

[11] 4,288,897
[45] Sep. 15, 1981

[54] METHOD OF PRODUCING A NUCLEATE BOILING SURFACE ON A HEAT TRANSFER MEMBER

[75] Inventor: James G. Withers, Jr., Decatur, Ala.

[73] Assignee: UOP Inc., Des Plaines, Ill.

[21] Appl. No.: 91,327

[22] Filed: Nov. 5, 1979

Related U.S. Application Data

[62] Division of Ser. No. 966,438, Dec. 4, 1978, Pat. No. 4,219,078.

[51] Int. Cl.$^3$ .............................................. B23P 15/26
[52] U.S. Cl. .................................... 29/157.4; 29/459; 165/133
[58] Field of Search ........ 29/157.4, 157.3 R, 157.3 D, 29/157.3 A, 157.3 B, 157.3 C, 459; 113/118 A, 118 B, 118 C, 118 D, 116 H, 116 UT; 165/133, 183, 151

[56] References Cited

U.S. PATENT DOCUMENTS

| | | | |
|---|---|---|---|
| 4,129,181 | 12/1978 | Janowski et al. | 165/133 |
| 4,136,427 | 1/1979 | Shum | 29/157.4 |
| 4,136,428 | 1/1979 | Godsey et al. | 29/157.4 |
| 4,219,078 | 8/1980 | Withers, Jr. | 165/133 |

Primary Examiner—Nicholas P. Godici
Assistant Examiner—V. K. Rising
Attorney, Agent, or Firm—James R. Hoatson, Jr.; Barry L. Clark; William H. Page, II

[57] ABSTRACT

Improved heat transfer surface for nucleate boiling is produced by metallizing a reticulated organic foam layer placed in contact with a tube or other heat transfer surface so as to form a reticulated metal surface layer which is integrally bonded to the heat transfer surface. The metallized foam layer is then at least partially pyrolyzed to form hollow metal strand portions. The boiling surface so produced is then modified to enhance its long term boiling stability by deforming the hollow strand portions to reduce their minimum internal diameter. In one manufacturing process, suitable small solid particles, which may or may not be permitted to remain in the finished product, are worked into the porous surface of the reticulated metal layer after which the layer is compacted so as to cause the particles to deform the hollow metal strand portions and thereby reduce their ability to carry liquid flow which could "flood out" vapor bubbles trapped in the tips of the hollow strands during a boiling operation. In another process, the reticulated metallic layer is bombarded with pellets such as steel shot which can deform the hollow metal strands and reduce their ability to transport liquid.

4 Claims, 7 Drawing Figures

METHOD OF PRODUCING A NUCLEATE BOILING SURFACE ON A HEAT TRANSFER MEMBER

This is a division of application Ser. No. 966,438, filed Dec. 4, 1978, and now U.S. Pat. No. 4,219,078, issued Aug. 26, 1980.

BACKGROUND OF THE INVENTION

This invention relates to heat transfer surfaces for nucleate boiling and improved means for producing such surfaces. For an extensive discussion of nucleate boiling and prior art patents related thereto, reference may be made to the disclosure of U.S. Pat. No. 4,129,181 allowed on Janowski et al co-pending U.S. Application Ser. No. 769,623, filed Feb. 16, 1977, and assigned to a common assignee, the subject matter of which is incorporated by reference herein. The aforementioned Janowski et al application discloses the concept of applying a porous reticulated foam layer to the surface of a tube or other heat transfer surface and then coating the foam layer and tube with a metal layer which will surround the internal skeleton of foam and have the same reticulated shape. Although the Janowski et al application teaches that the internal reticulated foam structure may be left intact or pyrolyzed to produce additional nucleation sites, it has been found that the initial good boiling performance of a tube covered with metallized foam having a pore size of about 45 pores per inch which has been fully pyrolyzed can deteriorate if boiling is extended over a period of time, such as several days. Since the tube surface cannot be studied during boiling, it is only conjecture that some of the initially active boiling sites which are presumed to exist at the ends and open portions of the hollow metal strands which remain after pyrolysis are "flooded out" by continued boiling. For example, it is conceivable that some of the vapor bubbles which are ordinarily trapped at the initially active boiling sites are washed away by the liquid, thus reducing the number of active boiling sites and the efficiency of boiling. Where the foam has a smaller pore size, such as 75 pores per inch, the boiling performance of a pyrolyzed tube does not seem to deteriorate in time since the diameter of the hollow strands formed from 75 pore per inch reticulated foam are smaller than the strands formed from 45 pore per inch foam.

SUMMARY OF THE INVENTION

It is among the objects of the present invention to provide an improved, reticulated metal nucleate boiling surface which will resist flooding under long term boiling conditions, and a method of producing such a surface. The surface is produced by coating a tube or other heat transfer member with a layer of porous, reticulated organic foam which is then plated with a thin layer of metal. The foam is then pyrolyzed, leaving the metal in a reticulated, hollow shape. To prevent the hollow metal strands from permitting liquid flow at a rate sufficient to "flood out" the boiling sites, the strands, or at least some of them, have their flow capability reduced by loading the surface with small particles such as sand, crushed limestone, metal shot, or organic matter such as crushed walnut shells which act as anvils to deform the strands when radially inward compressive forces are applied to the outside of the tube. The particles may be left in place or may be removed if their continued presence would be detrimental. In the latter situation, the particles should be made of a material which could be dissolved away. For example, organic material could be thermally oxidized and limestone particles could be destroyed by thermal and acid treatments.

The ideal diameter of the hollow metal strands for providing efficient boiling over a long period is believed to depend on the particular liquid being boiled and its various properties such as surface tension, pressure, temperature and the slope of the vapor pressure versus temperature curve. Thus, one might find that a reticulated metal boiling surface having the relatively larger internal hollow strand diameters produced by using a 45 pore per inch foam, for example, will be ideal for one boiling liquid and unsatisfactory for another which might perform better with the hollow strands produced by using a 75 pore per inch foam. The method of the present invention permits the boiling characteristics of a tube to be varied after it is manufactured so that the tube can have the efficiency of its nucleate boiling surface tailored to a particular liquid with which it is to be used.

DETAILED DESCRIPTION OF THE DRAWINGS

Figure 1:
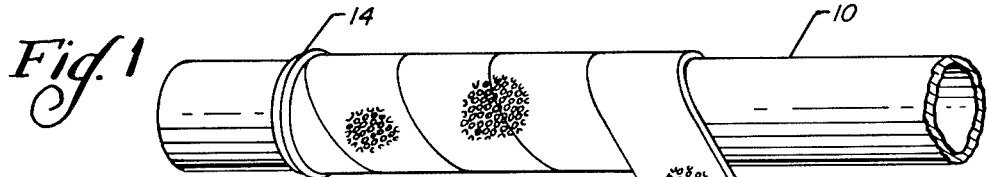
FIG. 1 illustrates a prior art technique disclosed in the aforementioned Janowski et al application for wrapping a tube with porous foam prior to a metal plating operation.
Figure 2:
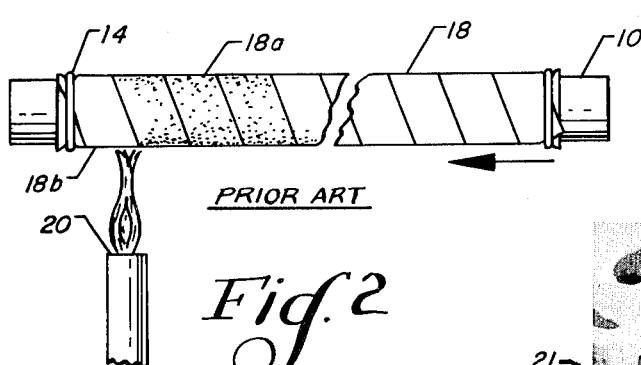
FIG. 2 illustrates a prior art technique for pyrolyzing the tube of FIG. 1 after it has been plated.
Figure 3:
FIG. 3 is a photomicrograph illustrating the surface configuration of the prior art tube of FIGS. 1 and 2 after it has been pyrolyzed.

FIGS. 1-3 relate to the prior art method of forming a nucleate boiling tube disclosed in the aforementioned Janowski et al copending patent application Ser. No. 769,623. A plain tube 10, usually of copper, is covered with a layer of open cell, reticulated foam 12 (shown as a strip) which may be anchored to the tube by a rubber band 14, for example. The foam is made electrically conductive, such as by being electrolessly plated or by being coated with a conductive material such as powdered graphite, as disclosed in Hanusa U.S. Pat. No. 3,549,505 or in copending Godsey et al Application Ser. No. 867,858 filed Jan. 9, 1978. The foam 12 is then metallized, usually with copper, in an electroplating solution to produce a reticular metallized structure which is firmly bonded to the underlying tube 10. In FIG. 2, the tube 10 is shown as having its metallized foam surface 18 pyrolyzed by a flame 20 so that the portions 18a of the surface which are introduced to the flame will have all or at least most of their foam skeleton core portions removed as they are moved through the flame so that only hollow or partially hollow metal strands 18b remain. A photomicrograph of the strands 18b is shown in FIG. 3 where one can see that the gases developed during pyrolyzation cause some of the strands to rupture and form openings 21. It is believed that nucleate boiling takes place at the openings 21 but that flooding and deterioration of boiling performance can result when the strands 18b are of too large a diameter. For example, pyrolyzed open celled foams having a pore size of 45 pores per inch seem to be subject to flooding in Refrigerant R-11 while 75 pore per inch foams seem to perform quite satisfactorily.

Figure 4:
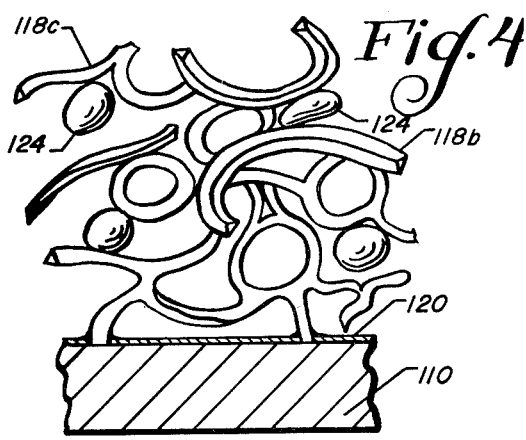
FIG. 4 is a longitudinal section through a tube of the type shown in FIG. 2 wherein particles have been worked into the reticulated metal coating on the tube surface.
Figure 6:
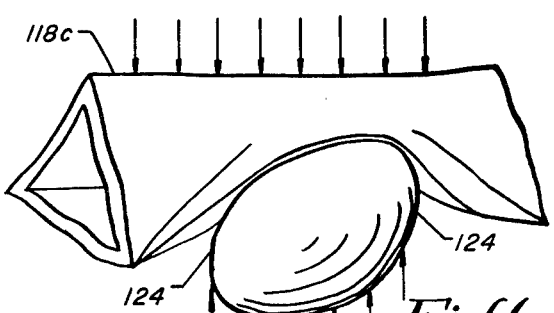
FIG. 6 is an enlarged view of a portion of the compressed surface of FIG. 5.

FIG. 4 illustrates a longitudinal section through the wall of a tube 110 which has a metallized, reticulated structure 118b bonded to it. The strand portions 118c of the structure are formed entirely of electroplated metal which also covers the surface of the tube 110 in an integral layer 120. The plated layer is preferably about 0.00025" to 0.0025" thick. The strands 118c are shown as being hollow since the organic foam core has been pyrolyzed. A series of particles 124 are shown as being dispersed in the structure 118b. The particles 124 are preferably squeezed into contact with the hollow strands 118c by passing the tube 110 with its reticulated layer 118b through compacting dies 126 which exert forces as illustrated by the arrows in FIG. 6 to cause the particles 124 to reduce the internal diameter of the hollow strands 118c. If desired, the particles are later removed, as previously discussed.

Figure 5:
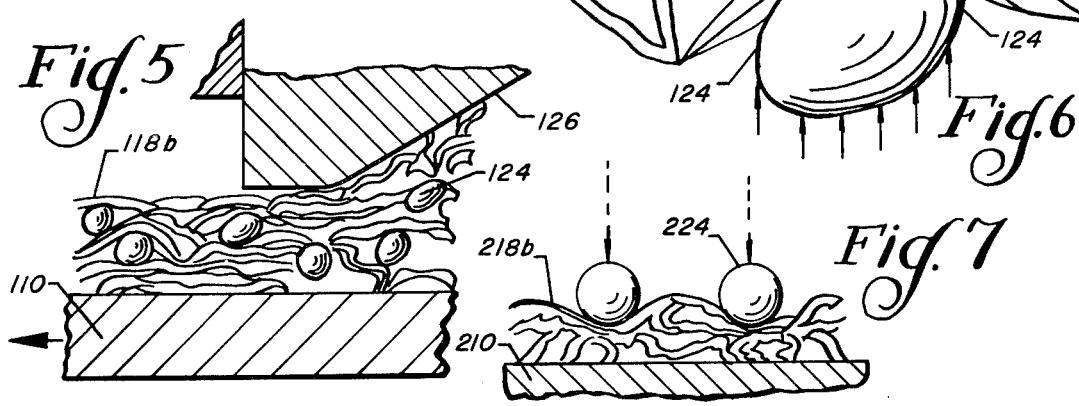
FIG. 5 is a longitudinal sectional view similar to FIG. 4 but illustrating the compaction of the coating surface of FIG. 4.
Figure 7:
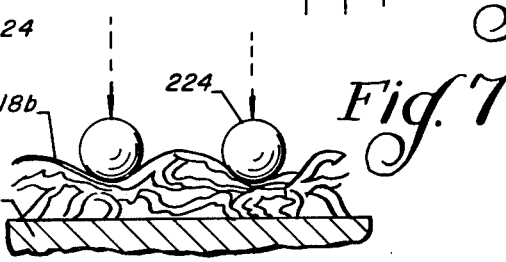
FIG. 7 is a longitudinal sectional view illustrating an alternative means of compressing the reticulated metal strands.

FIG. 7 is a view similar to FIG. 5 but illustrates an alternative method of compressing and deforming hollow metal strands located on a tube surface 210. Elements 224 such as shot are dropped on or projected against the outer layer of strands 218b in order to reduce their internal diameter. The action would not seem to be able to deform as many strands as the process shown in FIG. 5 but should be quite easy to control.

I claim:

1. A method of producing a nucleate boiling surface on a heat transfer member comprising the steps of: placing a layer of open cell reticulated organic foam into contact with the member; plating the foam layer and the underlying member with a metallic coating so as to surround the strands of the foam and integrally bond them to the member; heating the metallic coating to at least partially pyrolyze the strands of the foam so as to produce a reticulated array of connected, at least partially hollow metal strands which are periodically open to the atmosphere; engaging at least a substantial portion of the hollow metal strands with a plurality of solid particles with sufficient pressure to at least partially deform said hollow metal strands and reduce their internal diameter and their ability to transport liquid between spaced openings along their length.

2. The method of claim 1 wherein said solid particles are loaded into said reticulated array of metal strands under a very light pressure, said reticulated array of hollow metal strands then being compressed toward said heat transfer member at a higher pressure to cause said solid particles to deform said hollow metal strands.

3. The method of claim 2 wherein said heat transfer member is tubular and said higher pressure is produced by a drawing die through which said member is drawn.

4. The method of claim 2 wherein said solid particles are made of a material which can be separated from said reticulated array after said compression step.

* * * * *